Patented Dec. 24, 1946

2,413,055

UNITED STATES PATENT OFFICE 2,413,055

PROCESS FOR THE PREPARATION OF RIBOFLAVIN CONCENTRATES

Abraham Leviton, Washington, D. C., assignor to the United States of America, as represented by the Secretary of Agriculture No Drawing. Application March 29, 1943, Serial No. 480,951

10 Claims. (Cl. 167—81)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This application is a continuation-in-part of my copending application for patent, Serial No. 390,941, filed April 29, 1941.

My invention relates to a new and useful process for the preparation of riboflavin concentrates.

The object of my invention is the preparation of riboflavin concentrates, which are characterized by their marked potency and by their palatability.

I have found that milk sugar (lactose) as it crystallizes will adsorb riboflavin selectively if a definite minimum concentration of riboflavin is exceeded, and that the adsorption of riboflavin by lactose can be controlled to obtain vitamin concentrates rich in riboflavin (vitamin $B_2$).

My invention provides a method of preparing vitamin concentrates comprising crystalline lactose and riboflavin distributed throughout the crystalline mass. This vitamin concentrate is new. Neither its properties nor the manner of preparation has hitherto been known.

Although lactose is an important part of the human diet, particularly of infants, it cannot properly be designated as a vitamin concentrate even if it contains traces of riboflavin. The term "concentrate" properly designates, and is used throughout this application to designate, a product derived from a natural source of riboflavin and having a riboflavin concentration substantially greater than the riboflavin concentration of the natural source. To illustrate: Riboflavin concentration in natural products is expressed in terms of the number of micrograms of riboflavin per gram solid. Whey, the liquor remaining when skim milk is treated for the removal of casein, as in the manufacture of casein or cheese, contains an average of 20 micrograms of riboflavin per gram solids. By my process riboflavin concentrates can be obtained from whey having a concentration substantially exceeding 100 micrograms of riboflavin per gram solids. Another example is fish liver which contains an average of 100 micrograms of riboflavin per gram solids. Riboflavin concentrates can be prepared from fish liver by my process with a similar increase in concentration.

The term "concentrate" is further limited in this application to designate a product which is intended for human consumption and which has a riboflavin concentration sufficiently great for effective use in supplying the established minimum optional requirement of riboflavin for bread.

The established minimum optional requirement of riboflavin for bread is 800 micrograms per pound loaf. Skim milk solids, when used in bread in normal amounts, furnish only 360 micrograms per pound loaf. Based on the lactose present in the normal amount of skim milk solids used in bread, the riboflavin concentration necessary to satisfy the established minimum optional requirement is 80 micrograms of riboflavin per gram of lactose (which is to say, per gram solids). Allowing for variation in the amount of skim solids used in bread-making, this invention is accordingly limited to products having a riboflavin concentration of at least 100 micrograms of riboflavin per gram of lactose (or per gram solids).

Moreover, the products of this invention being intended for human consumption, they are distinguished from vitamin products intended for animal consumption by their greater vitamin concentration, by the palatability of any associated foreign substances, and by the compatibility of these foreign substances with the normal ingredients of the baking and dairy industries.

The scope of the term "concentrate" as defined and limited above is consistent with the generally accepted standards for vitamin concentrates used in the fortification and restoration of flour and allied substances.

Making use of my findings concerning the adsorptive properties of lactose with respect to riboflavin, I am able to prepare riboflavin concentrates by adjusting the conditions of concentration and temperature of the solutions from which the lactose is crystallized.

I have found that at low temperatures the quantity of riboflavin adsorbed per gram of lactose is expressed by the empirical formula:

$$a = \frac{c - c_0}{s - s_0} \qquad (1)$$

where $a$ is the quantity of riboflavin adsorbed in micrograms per gram of lactose; $c$ is the initial concentration of riboflavin and $c_0$ is the minimum concentration of riboflavin which must be exceeded before adsorption will occur, when the concentration of lactose is $s_0$, both in micrograms per milliliter of water; $s$ is the initial concentration of lactose and $s_0$ is the concentration of lactose when crystallization is suspended, both in grams per milliliter of water.

The application of my findings can be illustrated by considering the preparation of riboflavin concentrates from whey. The preparation of riboflavin concentrates from whey is well adapted to illustrate my invention because the lactose content of whey is too great to effect a high unit adsorption of riboflavin by ordinary crystallization methods. For this reason special procedures are required to adjust the relative concentrations of riboflavin and lactose. The explanation of these procedures provides a good illustration of the relation which must exist between the concentrations of riboflavin and lactose in order to obtain the riboflavin concentrates of this invention.

Whey contains an average of 20 micrograms of riboflavin and 0.7 grams of lactose per gram solids. In the manufacture of milk sugar (lactose) it is customary, prior to evaporation, to remove the greater proportion of the whey proteins and a substantial proportion of the mineral salts. The liquor remaining after this operation usually contains 6 percent solids of which 80 percent is lactose, and this liquor can be concentrated conveniently to 70 percent solids. At 5° C. a maximum quantity of 1.7 grams of lactose per milliliter of water can be crystallized from the concentrated liquor. At this temperature, the minimum concentration of riboflavin which must be exceeded before adsorption occurs is approximately 5 micrograms per milliliter of water. Inasmuch as the riboflavin concentration in the concentrated liquor is approximately 47 micrograms per milliliter of water, the maximum quantity of riboflavin which can be adsorbed by lactose is approximately 42 micrograms per milliliter of water. This would yield a product containing only about 25 micrograms of riboflavin per gram solids.

I have found, however, that riboflavin concentrates can be prepared from whey by crystallizing the lactose in two stages, the first stage being controlled so that a major portion of the lactose crystallizes with the adsorption of only traces of riboflavin, after which the remaining lactose is crystallized in a second stage under conditions which result in the adsorption of substantial quantities of riboflavin.

As previously stated, I have found that lactose will adsorb riboflavin selectively if a definite minimum concentration of riboflavin is exceeded. It follows that lactose can be crystallized substantially free of riboflavin if the definite minimum concentration of riboflavin is not exceeded. Thus, when concentrated whey or spray-processed whey powder is mixed with methyl alcohol, the lactose as it crystallizes will adsorb only traces of riboflavin provided the ratio of alcohol to whey solids is sufficiently great. For example, when one part by weight of spray-processed whey powder is treated with not less than 40 parts by weight of 80 percent (or less, by weight) methyl alcohol, the lactose as it crystallizes adsorbs only traces (less than 0.1 microgram per gram) of riboflavin. This results from the fact that the concentration of riboflavin in the methyl alcohol solution is less than the minimum concentration which must be exceeded before adsorption takes place.

The minimum riboflavin concentration which must be exceeded varies with the concentration of alcohol, and decreases from 5 micrograms per milliliter for water to 0.4 microgram per milliliter for 80 percent methyl alcohol. It also depends upon the degree of supersaturation with respect to lactose, decreasing as the degree of supersaturation with respect to lactose decreases to a final minimum value in aqueous solutions of approximately 5 micrograms per milliliter of water, and a final minimum value in 80 percent methyl alcohol of 0.4 micrograms per milliliter of 80 percent methyl alcohol.

Stated in other words, there is a definite minimum concentration of riboflavin, for any particular solution, corresponding to a definite degree of supersaturation with respect to lactose which must be exceeded before adsorption of riboflavin by lactose will occur. For example, if the lactose concentration in a whey solution maintained at a temperature of 5° C. is not allowed to fall below 0.72 gram per milliliter of water, adsorption will not occur. However, if the lactose concentration were allowed to fall from 0.72 gram to 0.18 gram per milliliter of water, adsorption would occur until the riboflavin concentration reached 5 micrograms per milliliter of water.

These findings make it possible to effect a partial crystallization of lactose in a manner such that substantially all of the riboflavin remains in the mother liquor. To illustrate: If one part by weight of spray-dried whey powder is mixed with 15 parts by weight of 80 percent methyl alcohol, a solution is obtained which contains at room temperature 2.7 grams of excess lactose (that is, in excess of saturation) and 133 micrograms of riboflavin per 100 grams of 80 percent methyl alcohol. The minimum concentration of riboflavin which must be exceeded before adsorption occurs at this level of supersaturation with respect to lactose exceeds 133 micrograms per 100 grams, and consequently no adsorption occurs during the early stages of crystallization. Only when the degree of supersaturation becomes less than 0.6 gram of lactose per 100 grams of 80 percent methyl alcohol does significant adsorption begin to take place. Corresponding to 85 percent crystallization only 3 percent of the riboflavin is adsorbed. If, then, the crystallization of lactose is allowed to proceed only 85 percent to completion, a residual mother liquor may be obtained following the separation of crystalline lactose which contains practically all of the riboflavin in solution. This liquor may then be used as a source of riboflavin and lactose with which to accomplish the second stage of the crystallization process.

The solids of the mother liquor resulting from the first stage of the crystallization process contain approximately 60 percent lactose. If this liquor is subjected to distillation to recover the alcohol, a second residual liquor is obtained which can be conveniently concentrated. The second stage of the crystallization process depends on the adjustment of the total solids concentration of this residual liquor within limits which will now be defined. By definition of the term "concentrate," the lower limit of $a$ in Formula 1 has been set at 100 micrograms per gram of lactose. The value of $c_0$ and $s_0$, assuming crystallization is to be carried substantially to completion so that $s_0$ becomes the concentration of lactose at saturation, can be determined experimentally as, respectively, 5 micrograms and 0.18 gram per milliliter of water at approximately 5° C. The value of $c$ and $s$ can be expressed in terms of the total solids concentration as follows:

$$c = \frac{\% \text{ solids}}{\% \text{ solvent}} \times k_1 \qquad (2)$$

$$s = \frac{\% \text{ solids}}{\% \text{ solvent}} \times k_2 \qquad (3)$$

where % solids plus % solvent equal 100%, and $k_1$ and $k_2$ are constants readily determinable from analysis of the source of riboflavin used. For the present consideration of the preparation of riboflavin concentrates from whey, Formulas 2 and 3 become:

$$c = \frac{\% \text{ solids}}{\% \text{ water}} \times 50 \qquad (4)$$

$$s = \frac{\% \text{ solids}}{\% \text{ water}} \times 0.60 \qquad (5)$$

If, then, $a$ is set equal to 100 in Formula 1 and Formulas 1, 4, and 5 are solved simultaneously for the concentration of total solids, a value of approximately 55 percent is obtained. This determines the upper limit of total solids concentration. That is, a total solids concentration above this limit would result in a concentrate containing less than 100 micrograms of riboflavin per gram of lactose.

The lower limit of total solids concentration depends on solubility considerations. In order for crystallization to occur, the total solids concentration must be such that the concentration of lactose measurably exceeds its saturation concentration. In the case of whey, this lower limit of total solids concentration is 25 percent.

If the residual whey liquor resulting from the first stage of crystallization is concentrated to a total solids concentration exceeding 25 percent but not in excess of 55 percent, it can be used to effect a second crystallization in which adsorption of riboflavin by the crystallizing lactose will occur to the extent of not less than 100 micrograms of riboflavin per gram of lactose. The actual solids concentration selected within the limits specified depends upon the vitamin concentration desired. As the solids concentration approaches 25 percent, the degree of adsorption increases markedly. Quite concentrated products exceeding 300 micrograms of riboflavin per gram of lactose are obtained at solids concentrations below 30 percent.

While the empiric relation in formula 1 above is valid at room temperature, the temperature of crystallization should be substantially below room temperature in order to obtain a degree of enrichment consistent with good yields. I have conducted the crystallization at temperatures between 5°–7° C., inasmuch as these temperatures have been readily accessible. The use of lower temperatures, however, has the advantage that products of increased potency are obtained in greater yields.

Also, it is quite important that the crystallization be carried substantially to completion. It is only in the later stages of the crystallization process that substantial quantities of riboflavin are adsorbed, and consequently a concentrate will not be obtained unless crystallization proceeds substantially to completion.

Use of this method in the preparation of a riboflavin concentrate from whey is illustrated by the following example:

*Example I.*—10 pounds of spray-processed Cheddar cheese whey was agitated with 150 pounds of 80 percent (by weight) methyl alcohol. After agitation for several minutes, the suspended material was permitted to settle. The supernatant liquor was syphoned off, and filtered, and the residual sludge was also filtered. The combined filtrates were stirred for approximately five hours, and the lactose which crystallized was removed by centrifugalization. 3.4 pounds of lactose was recovered. This lactose upon analysis was found to contain 1.5 micrograms of riboflavin per gram of lactose. The riboflavin adsorbed (2500 micrograms) comprised approximately 3 percent of the riboflavin in solution, and consequently 97 percent of the riboflavin remained in the mother liquor. The alcohol was removed and recovered by distillation, and the residual liquor was concentrated to contain 40 percent solids. The resulting liquor was filtered, cooled to approximately 5° C., and stirred for several days. The lactose which crystallized was separated by centrifugalization. 1.8 pounds of lactose containing 135 micrograms riboflavin per gram of lactose was recovered comprising an overall yield of riboflavin of approximately 80 percent. The mother liquor resulting in the last operation could be combined with the working liquor in subsequent operations so that the yield of riboflavin covering an extended number of runs could be increased.

I am not limited in the foregoing example to methyl alcohol as a solvent; other solvents, such as ethyl alcohol, acetone, and isopropyl alcohol may be used, and the proportions of alcohol and water may be varied. It is necessary only that the ratio between the quantity of whey solids and the quantity of solvent be adjusted in such a manner that the minimum concentration of riboflavin at which adsorption occurs is not exceeded until the separation of a substantial proportion of the crystalline lactose has been effected.

Also, it is entirely possible to effect the second stage of the crystallization operation in the organic solvent in which the first stage was effected. This is illustrated by the following example:

*Example II.*—10 pounds of spray-processed whey powder was stirred into 150 pounds of 80 percent (by weight) methyl alcohol. After agitation for several minutes, the suspended material was permitted to settle. The supernatant liquor was syphoned off and filtered; and the residual sludge was also filtered. The combined filtrates were stirred for approximately five hours and the lactose which separated was removed by centrifugalization. The filtrate was acidified with 150 cc. of concentrated hydrochloric acid, and stirred. After several days, 0.45 pound of lactose containing 200 micrograms of riboflavin per gram of lactose had separated. These were separated and recovered by centrifugalization.

The methods disclosed in Examples I and II above give excellent results, but the use of organic solvents involves the difficulties inherent in solvent recovery. I have developed an alternative method of conducting the first stage of the crystallization process which eliminates the use of organic solvents and thus avoids these difficulties.

I have found that the minimum concentration of riboflavin at which adsorption occurs is also a function of temperature, and that it increases rapidly as the temperature of crystallization increases. Thus, the minimum concentration increases from a value of 5 micrograms per milliliter of water at 5° C. to approximately 45 micrograms per milliliter of water at 60° C.

In my alternative method I make use of this finding to effect the crystallization of a large proportion of the lactose between 55° C. and 60° C. in such a manner that practically all of the riboflavin remains in the mother liquor. The mother liquor is then diluted with water, cooled, and subjected to agitation, as a result of which a second crop of lactose crystals containing the greater portion of the riboflavin in whey is recovered.

The concentrate obtained in this manner contains approximately 100 micrograms of riboflavin per gram of lactose. The lactose corresponds in quality to the crude lactose of commerce. The lactose is next subjected to a refining operation. As a result of this refining operation, a product containing approximately 300 micrograms of riboflavin per gram of lactose is obtained. This product may be refined further to yield an enriched product containing more than 500 micrograms of riboflavin per gram of lactose.

The following example illustrates the use of my alternative method:

*Example III.*—To 1000 pounds of grain curd casein whey, sufficient calcium oxide was added to render the acidity 0.05 percent calculated as lactic acid. The batch was heated to boiling (light excluded) and the supernatant liquor was decanted from most of the albuminous sludge which formed. The liquor and then the sludge were filtered and the combined filtrates were concentrated in vacuo to contain approximately 70 percent solids. The concentrated filtrate was then agitated between 55° and 60° C. until crystallization of lactose was complete. The lactose crystals were separated and the resulting mother liquor which contained practically all of the riboflavin in whey was diluted with 12 pounds of water per 100 pounds of liquor. This mixture was cooled to, and agitated at, 5° C. until crystallization was complete. The lactose, which crystallized to the extent of 9 pounds per 1000 pounds of whey, contained approximately 140 micrograms of riboflavin per gram of lactose. This batch of lactose was dissolved in water to yield a solution containing 30 parts of lactose per 100 parts of water. A small quantity of Filter Cel (filter aid) was added (0.25 percent on the basis of lactose treated), and the mixture was acidified with hydrochloric acid to the point at which the acidity tested 0.09 percent. Sufficient calcium oxide was added to reduce this acidity to 0.05 percent. The mixture was heated to boiling and then filtered. The filtrate was cooled to 5°–7° C. and agitated. The lactose which crystallized contained approximately 300 micrograms of riboflavin per gram. The lactose was recovered and washed with cold water. As the resulting wash liquor contained a small amount of riboflavin, in large-scale operations it could be collected and used in processing the next batch of whey.

The influence of the refining operation on the degree of adsorption may be illustrated by reference to Formula 1:

$$a=\frac{c-c_0}{s-s_0} \qquad (1)$$

If the weight of lactose containing $a'$ micrograms of riboflavin per gram of lactose is $w$ grams and the volume of water in which the lactose is dissolved is $v$ milliliters, then $$c=\frac{a'w}{v}$$

and $$s=\frac{w}{v}$$

substituting in Formula 1

$$a=\frac{\frac{a'w}{v}-c_0}{\frac{w}{v}-s_0} \qquad (6)$$

It has been noted previously that at approximately 5° C. $c_0$ and $s_0$ are, respectively, 5 micrograms and 0.18 gram per milliliter of water. Formula 6 then becomes:

$$a=\frac{\frac{a'w}{v}-5}{\frac{w}{v}-0.18} \qquad (7)$$

The application of this formula is illustrated by considering the refining operation in Example III. The crude concentrate in that example contained approximately 140 micrograms of riboflavin per gram of lactose and the refining solution was prepared in the proportion of 30 parts of lactose to 100 parts of water which is substantially 30 grams of lactose to 100 milliliters of water. Thus, Formula 7 becomes:

$$a=\frac{\frac{140\times 30}{100}-5}{\frac{30}{100}-0.18}$$

Solving for $a$, a value of approximately 300 micrograms of riboflavin per gram of lactose is obtained as stated in Example III. Further refining operations may be employed to obtain an increase in purity and concentration.

Also, refining operations may be used to obtain a riboflavin concentration of at least 100 micrograms per gram of lactose from a product containing less than that concentration. If Formula 7 is solved for the condition when $a=a'$, a value for $a'$ of approximately 28 micrograms of riboflavin per gram of lactose will be obtained. That is, if the refining operation is to lead to enrichment the concentration of riboflavin in the product to be refined must be at least 28 micrograms per gram of lactose. This is explained by the fact that a small amount of riboflavin will not be adsorbed from the refining solution so that it is necessary to have an initial concentration sufficiently high to compensate for this loss.

As a practical matter I have found it advisable, in order to obtain a satisfactory rate of crystallization, to use a lactose concentration of at least 0.3 grams per milliliter of water. This imposes a further limitation on the initial concentration of riboflavin, for if $a$ in Formula 7 is set equal to 100 and $$\frac{w}{v}$$

is set equal to 0.3, a value for $a'$ of 57 micrograms of riboflavin per gram of lactose results. Thus, the product to be refined should have at least this concentration. Such a product can be prepared from whey by a modification of the procedure in Example III to take advantage of the fact previously mentioned, that during the early stages of crystallization of lactose from concentrated whey no riboflavin is adsorbed.

The concentrations of riboflavin and lactose at which adsorption will begin at room temperature can be determined from experimental results to be related as follows:

$$s = 0.80 - \frac{5.6}{c} \quad (8)$$

where $s$ is the concentration of lactose in grams per milliliter of water and $c$ is the concentration of riboflavin in micrograms per milliliter of water. For a given value of $c$ no adsorption will occur if the value of $s$ exceeds the value defined by Formula 8, and, conversely, for a given value of $s$ the value of $c$ must be greater than that defined by Formula 8 before adsorption will occur.

If, as in Example III, the whey filtrate is concentrated to 70 percent solids, a solution is obtained which contains approximately 45 micrograms of riboflavin and 1.8 grams of lactose per milliliter of water. Solving Formula 8 for $c$ equal to 45 micrograms of riboflavin per milliliter of water, a value for $s$ of about 0.7 gram of lactose per milliliter of water is obtained. Thus, if the crystallized lactose is separated during the crystallization process when the lactose concentration of the solution reaches 0.7 gram per milliliter, the mother liquor will retain practically all of the riboflavin originally present. If the mother liquor is then cooled and crystallization is continued at a low temperature, the crystallized lactose will have a riboflavin concentration of between 70 and 80 micrograms per gram of lactose. If this product is subjected to a refining operation, a riboflavin concentrate can be obtained having a concentration of approximately 160 micrograms per gram of lactose. The following example illustrates this procedure:

*Example IV.*—A concentrated whey filtrate containing 70 percent solids was obtained by the method set forth in Example III. This filtrate was cooled to room temperature, and crystallization was allowed to proceed to the point at which approximately 0.7 gram of lactose per milliliter of water remained in solution. The batch was then hurriedly centrifugalized. The filtrate was cooled to 5°–7° C. and agitated for several days. The lactose which crystallized to the extent of 14 pounds per 1000 pounds of whey contained approximately 80 micrograms of riboflavin per gram of lactose. This batch of lactose was dissolved in water to yield a solution containing 30 parts of lactose per 100 parts of water. The refining operation from this point on paralleled Example III. A refined product containing approximately 160 micrograms riboflavin per gram lactose was obtained.

The method used in Example IV above is, however, not an easy one to control, because the rate of crystallization of lactose is quite rapid, which makes it rather difficult to strike the batch at just the proper concentration of lactose. For this reason the method set forth in Example III is much more easily used.

While I have illustrated my invention by the preparation of riboflavin concentrates from whey, I am not limited to the use of whey as a source of riboflavin. Other sources, such as distillers' solubles, yeast extract, liver extract, and slops from butyl alcohol fermentation processes, may be used, lactose or whey being added to fortify them with the proper proportion of lactose.

The preparation of a riboflavin concentrate from whey, as illustrated, entails a two-stage crystallization process in the first stage of which temperature and conditions of relative concentration are adjusted to allow the crystallization of lactose substantially free of riboflavin, and in the second stage of which temperature and conditions of selective concentration are adjusted to yield a riboflavin concentrate.

A two-stage crystallization process is, however, not necessary when the riboflavin concentrate is prepared from a riboflavin containing liquor derived from a source other than whey, because a high initial lactose content is not encountered. It is only necessary that such liquor be fortified with lactose to yield a solution having relative concentrations of riboflavin and lactose such that a riboflavin concentrate can be obtained. It would, of course, also be possible to add sufficient riboflavin to whey to obtain the required condition of relative concentration.

The conditions of relative concentration required have been heretofore defined by Formula 1. The terms of Formula 1 can be rearranged as follows:

$$s = \frac{c - c_0 + a s_0}{a} \quad (9)$$

By definition, $a$ is limited to at least 100 micrograms of riboflavin per gram of lactose, so that as a limiting relation Formula 9 may be stated as:

$$s = \frac{c - c_0 - 100 s_0}{100} \quad (10)$$

Formula 10 defines, in relation to a given concentration of riboflavin $c$, the concentration of lactose $s$ which must not be exceeded if a concentrate containing at least 100 micrograms of riboflavin per gram of lactose is to be obtained at temperatures substantially below room temperature.

At a temperature of about 5° C. Formula 10 becomes:

$$s = \frac{c + 13}{100}$$

$c_0$ and $s_0$ being 5 micrograms per milliliter of water and 0.18 gram per milliliter of water, respectively, at this temperature.

Concerning the purity of the riboflavin concentrates of this invention, light adsorption measurements indicate that they are interchangeable with admixtures of lactose and crystalline synthetic riboflavin of like potency. Pharmaceutical preparations of riboflavin in tablet form usually consist of synthetic riboflavin admixed with the vehicle of diluent milk sugar, and consequently my riboflavin concentrates may be utilized in pharmaceutical preparations directly or with supplements of synthetic riboflavin.

Having thus described my invention, I claim:

1. The process of preparing a riboflavin concentrate which comprises forming an aqueous solution of a riboflavin-containing substance in a proportion such that the concentration of riboflavin in said solution exceeds 5 micrograms per milliliter of water, adding sufficient lactose to said solution to obtain a concentration of lactose in excess of 0.18 grams per milliliter of water but not in excess of the concentration defined by the following formula $$s = \frac{c + 13}{100}$$

where $s$ is the concentration of lactose which must not be exceeded, in grams per milliliter of water, and $c$ is the concentration of riboflavin in said solution, in micrograms per milliliter of water, cooling said solution to a temperature of about 5° C., crystallizing lactose from said solution until crystallization is substantially complete, and then recovering the crystallized lactose, whereby a riboflavin concentrate is obtained comprising crystalline lactose having riboflavin adsorbed throughout the crystalline mass in the proportion of not less than 100 micrograms of riboflavin per gram of lactose.

2. The process of preparing a riboflavin concentrate from whey which comprises forming a solution of whey in 80 percent methyl alcohol in the ratio of at least 40 parts of methyl alcohol per part of whey solids, crystallizing lactose from said solution until crystallization is substantially complete, separating the crystallized lactose, removing the methyl alcohol from the mother liquor, concentrating the mother liquor to at least 25 but not more than 55 percent solids, cooling the mother liquor to a temperature of about 5° C., crystallizing a second batch of lactose from the mother liquor until crystallization is substantially complete, and then recovering said second batch of crystallized lactose, whereby a riboflavin concentrate is obtained comprising crystalline lactose having riboflavin adsorbed throughout the crystalline mass in the proportion of not less than 100 micrograms of riboflavin per gram of lactose.

3. The process of preparing a riboflavin concentrate which comprises forming a solution of whey in 80 percent methyl alcohol in the ratio of 15 parts of methyl alcohol per part of whey solids, crystallizing lactose from said solution for approximately 5 hours, thereby crystallizing about 85 percent of the lactose in the said solution, separating the crystallized lactose, removing the methyl alcohol from the mother liquor, concentrating the mother liquor to at least 25 but not more than 55 percent solids, cooling the mother liquor to a temperature of about 5° C., crystallizing a second batch of lactose crystals from the mother liquor until crystallization is substantially complete, and then recovering said second batch of crystallized lactose, whereby a riboflavin concentrate is obtained comprising crystalline lactose having riboflavin adsorbed throughout the crystalline mass in the proportion of not less than 100 micrograms of riboflavin per gram of lactose.

4. The process of preparing a riboflavin concentrate which comprises forming a solution of whey in 80 percent methyl alcohol in the ratio of 15 parts of methyl alcohol per part of whey solids, crystallizing lactose from said solution for approximately 5 hours, thereby crystallizing about 85 percent of the lactose in said solution, separating the crystallized lactose, cooling the mother liquor to a temperature of about 5° C., crystallizing a second batch of lactose crystals from the mother liquor until crystallization is substantially complete, and then recovering said second batch of crystallized lactose, whereby a riboflavin concentrate is obtained comprising crystalline lactose having riboflavin adsorbed throughout the crystalline mass in the proportion of not less than 100 micrograms of riboflavin per gram of lactose.

5. The process of preparing a riboflavin concentrate from whey which comprises concentrating whey to approximately 70 percent solids, crystallizing lactose from the concentrated whey at a temperature of about 55° to 60° C. until crystallization is substantially complete, separating the crystallized lactose, cooling the mother liquor substantially below room temperature, crystallizing a second batch of lactose from said mother liquor until crystallization is substantially complete, and then recovering said second batch of crystallized lactose, whereby a riboflavin concentrate is obtained comprising crystalline lactose having riboflavin adsorbed throughout the crystalline mass in the proportion of not less than 100 micrograms of riboflavin per gram of lactose.

6. The process of preparing a riboflavin concentrate from whey which comprises concentrating whey to approximately 70 percent solids, crystallizing lactose from the concentrated whey at a temperature of about 55° to 60° C. until crystallization is substantially complete, separating the crystallized lactose, cooling the mother liquor to a temperature of about 5° C., crystallizing a second batch of lactose from said mother liquor until crystallization is substantially complete, and then recovering said second batch of crystallized lactose, whereby a riboflavin concentrate is obtained comprising crystalline lactose having riboflavin adsorbed throughout the crystalline mass in the proportion of not less than 100 micrograms of riboflavin per gram of lactose.

7. The process of preparing a riboflavin concentrate from whey which comprises concentrating whey to approximately 70 percent solids, crystallizing lactose from the concentrated whey at a temperature of about 55° to 60° C. until crystallization is substantially complete, separating the crystallized lactose, cooling the mother liquor substantially below room temperature, crystallizing a second batch of lactose from said mother liquor until crystallization is substantially complete, recovering said second batch of crystallized lactose, forming a supersaturated solution of said second batch of crystallized lactose in water in the proportion of at least 0.3 grams of lactose per milliliter of water, heating said solution to the boiling point, filtering said solution, cooling the filtrate substantially below room temperature, crystallizing lactose from said filtrate until crystallization is substantially complete, and then recovering the crystallized lactose from said filtrate, whereby a riboflavin concentrate is obtained comprising crystalline lactose having riboflavin adsorbed throughout the crystalline mass in the proportion of substantially more than 100 micrograms of riboflavin per gram of lactose.

8. The process of preparing a riboflavin concentrate from whey which comprises concentrating whey to approximately 70 percent solids, crystallizing lactose from the concentrated whey at a temperature of about 55° to 60° C. until crystallization is substantially complete, separating the crystallized lactose, cooling the mother liquor to a temperature of about 5° C., crystallizing a second batch of lactose from said mother liquor until crystallization is substantially complete, recovering said second batch of crystallized lactose, forming a solution of said second batch of crystallized lactose in water in the proportion of 30 parts of lactose to 100 parts of water, heating said solution to the boiling point, filtering said solution, cooling the filtrate to a temperature of about 5° C., crystallizing lactose from said filtrate until crystallization is substantially complete, and then recovering the crystallized lactose from said filtrate, whereby a riboflavin concentrate is obtained comprising crystalline lactose having riboflavin adsorbed throughout the crystalline mass in the proportion of substantially more than 100 micrograms of riboflavin per gram to lactose.

9. The process of preparing a riboflavin concentrate from whey which comprises concentrating whey to approximately 70 percent solids, crystallizing lactose from said concentrated whey at room temperature until the concentration of lactose remaining in solution is approximately equal to the concentration defined by the following formula $$s = 0.80 - \frac{5.6}{c}$$

where $s$ is the concentration of lactose remaining in solution in grams per milliliter of water and $c$ is the initial concentration of riboflavin in micrograms per milliliter of water, separating the crystallized lactose, cooling the mother liquor substantially below room temperature, crystallizing a second batch of lactose from said mother liquor until crystallization is substantially complete, recovering said second batch of crystallized lactose, forming a supersaturated solution of said second batch of crystallized lactose in water in the proportion of at least 0.3 gram of lactose per milliliter of water, heating said solution to the boiling point, filtering said solution, cooling the filtrate substantially below room temperature, crystallizing lactose from said filtrate until crystallization is substantially complete, and then recovering the crystallized lactose from said filtrate, whereby a riboflavin concentrate is obtained comprising crystalline lactose having riboflavin adsorbed throughout the crystalline mass in the proportion of substantially more than 100 micrograms of riboflavin per gram of lactose.

10. The process of preparing a riboflavin concentrate from whey which comprises concentrating whey to approximately 70 percent solids, crystallizing lactose from said concentrated whey at room temperature until the concentration of lactose remaining in solution is approximately equal to the concentration defined by the following formula $$s = 0.80 - \frac{5.6}{c}$$

where $s$ is the concentration of lactose remaining in solution in grams per milliliter of water and $c$ is the initial concentration of riboflavin in micrograms per milliliter of water, separating the crystallized lactose, cooling the mother liquor substantially below room temperature, crystallizing a second batch of lactose from said mother liquor until crystallization is substantially complete, recovering said second batch of crystallized lactose, forming a solution of said second batch of crystallized lactose in water in the proportion of 30 parts of lactose to 100 parts of water, heating said solution to the boiling point, filtering said solution, cooling the filtrate to a temperature of about 5° C., crystallizing lactose from said filtrate until crystallization is substantially complete, and then recovering the crystallized lactose from said filtrate, whereby a riboflavin concentrate is obtained comprising crystalline lactose having riboflavin adsorbed throughout the crystalline mass in the proportion of substantially more than 100 micrograms of riboflavin per gram of lactose.

ABRAHAM LEVITON.